United States Patent
Haddad et al.

(10) Patent No.: US 12,067,402 B2
(45) Date of Patent: Aug. 20, 2024

(54) VALIDATION OF IPXE SCRIPTS USING OWNER CERTIFICATES AND OWNERSHIP VOUCHERS

(71) Applicant: Cisco Technology, Inc., San Jose, CA (US)

(72) Inventors: Reda Haddad, San Jose, CA (US); Martin Edward Ramsdale, Harpenden (GB); Srihari Raghavan, Chennai (IN); Jabir Hamediya Mohammed, Bangalore (IN); Sandesh K. Rao, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 29 days.

(21) Appl. No.: 17/943,440

(22) Filed: Sep. 13, 2022

(65) Prior Publication Data

US 2024/0086205 A1 Mar. 14, 2024

(51) Int. Cl.
| | | |
|---|---|---|
| *G06F 9/4401* | (2018.01) | |
| *G06F 9/448* | (2018.01) | |
| *H04L 9/32* | (2006.01) | |

(52) U.S. Cl.
CPC .......... *G06F 9/4401* (2013.01); *G06F 9/4482* (2018.02); *H04L 9/3268* (2013.01)

(58) Field of Classification Search
CPC ...... G06F 9/4401; G06F 9/4482; G06F 21/44; G06F 21/57; G06F 21/64; H04L 9/3268; H04L 9/3247
See application file for complete search history.

(56) References Cited

U.S. PATENT DOCUMENTS

| | | |
|---|---|---|
| 10,742,421 B1 | 8/2020 | Wentz et al. |
| 10,855,674 B1 | 12/2020 | Geusz et al. |
| 2008/0037781 A1* | 2/2008 | Kocher ................. H04L 9/0891 |
| | | 380/201 |

(Continued)

OTHER PUBLICATIONS

Hacker et al., "EL2W: Extended Layer 2 Services for Bare-Metal Provisioning Over WAN," 2023 IEEE Cloud Summit Year: 2023 | Conference Paper | Publisher: IEEE.*

(Continued)

*Primary Examiner* — Roderick Tolentino
(74) *Attorney, Agent, or Firm* — Lee & Hayes, P.C.

(57) ABSTRACT

Techniques and architecture are described for validating and verifying iPXE scripts prior to execution during a booting process. During the booting process of a network device, right after the UEFI/BIOS stage of the booting process, a trusted iPXE script may make a request to a network server for the ownership voucher and owner certificate of the network device. The ownership voucher and owner certificate may then be stored in a trusted platform module (TPM) on the network device. In configurations, the retrieved owner certificate may be validated by the ownership voucher. The owner certificate may be used to validate iPXE scripts. Once validated, the iPXE scripts may be executed and the booting process may be continued to the kernel loading step and the application loading step. During a subsequent booting process of the network device, the ownership voucher and owner certificate may be retrieved from the TPM.

17 Claims, 4 Drawing Sheets

(56) References Cited

U.S. PATENT DOCUMENTS

| | | | | |
|---|---|---|---|---|
| 2008/0101604 | A1* | 5/2008 | Kocher | G11B 20/00659 |
| | | | | 380/210 |
| 2013/0254521 | A1* | 9/2013 | Bealkowski | G06F 9/445 |
| | | | | 713/2 |
| 2016/0350535 | A1 | 12/2016 | Garcia | |
| 2018/0075242 | A1* | 3/2018 | Khatri | H04L 9/3263 |
| 2020/0184078 | A1* | 6/2020 | Hinrichs | H04L 9/3268 |
| 2021/0044441 | A1 | 2/2021 | Nitschke | |
| 2021/0306157 | A1* | 9/2021 | Wattiau | H04L 9/3265 |
| 2022/0393884 | A1* | 12/2022 | Panchamia | H04L 9/083 |
| 2022/0407836 | A1* | 12/2022 | Narayanan | G06F 9/4416 |
| 2023/0127223 | A1* | 4/2023 | Khatri | G06F 21/73 |
| | | | | 726/22 |
| 2023/0239165 | A1* | 7/2023 | Young | H04L 9/0891 |
| | | | | 713/175 |

OTHER PUBLICATIONS

Khan et al., "Block Level Streaming Based Alternative Approach for Serving a Large Number of Workstations Securely and Uniformly," 2018 1st International Conference on Data Intelligence and Security (ICDIS) Year: 2018 | Conference Paper | Publisher: IEEE.*
Bruno, Andrew E., et al., "Grendel: Bare Metal Provisioning System for High Performance Computing," Practice and Experience in Advanced Research Computing (PEARC ' 20), Jul. 26-30, 2020, Portland, OR, 6 pages.

* cited by examiner

ACCESS, BY A NETWORK DEVICE, AN iPXE, WHEREIN THE iPXE SCRIPT IS SIGNED BASED ON AN OWNERSHIP CERTIFICATE (OC)

302

BASED AT LEAST IN PART ON THE OC, VALIDATE THE iPXE SCRIPT

304

EXECUTE, BY THE NETWORK DEVICE, THE iPXE SCRIPT

VALIDATION OF IPXE SCRIPTS USING OWNER CERTIFICATES AND OWNERSHIP VOUCHERS

TECHNICAL FIELD

The present disclosure relates generally to verification of open source pre-boot eXecution environment (iPXE) scripts using owner certificates and ownership vouchers, and more particularly, to enabling iPXE scripts during pre-boot using signature validation and verification via owner certificates and ownership vouchers.

BACKGROUND

An open-source implementation of the pre-boot eXecution environment (PXE) standard is iPXE. iPXE can be part of the very first stages of a node boot, either as part of the unified extensible firmware interface (UEFI) boot, or as part of the basic input output System (BIOS) boot, both of which come pre-kernel/operating system (OS) and pre-zero touch provisioning (ZTP). iPXE allows a node to download media (e.g., kernels, filesystems, iPXE scripts) from external sources (e.g., via the network), and execute from this media (e.g., iPXE scripts, boot an OS). iPXE scripts allow for customizing such boot options using advanced constructs including all iPXE command line options. iPXE scripts may be embedded into the iPXE executable, any such embedded scripts can be trusted since the iPXE executable (including any embedded items) should be verified before execution. iPXE scripts from other sources (e.g., downloaded from the network, or located on persistent storage on the network device) are considered untrusted. If these untrusted scripts are not verified before execution, they open up a threat surface very early in the boot process, i.e., in practice, iPXE scripts allow chain loading non-signed images. This defeats the purpose of securely booting a device or node. The unqualified use of "iPXE script(s)" herein shall refer to "non-embedded iPXE scripts" (i.e., those that require explicit verification).

Additionally, co-location deployment of network devices, e.g., servers, routers, caching devices, etc., are an example of a use case where device specific and signed iPXE script clarification and validation is extremely important. If the network device is deployed in a network where there are multiple co-located servers, for example, that belong to different service providers, it is important to make sure that the network device boots from the "intended" service provider network for which it is deployed and not from other co-located service provider servers and/or hacked service provider servers.

Creating these iPXE scripts that are both device specific and signed presents a challenge as the trusted certificates embedded on the network device are that of the manufacturer, who does not wish to sign directly the scripts created by the network device owner.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

The present disclosure describes techniques and architecture for validating and verifying iPXE scripts prior to execution during a booting process, e.g., a boot up process, a bootstrap process, etc. The techniques and architecture utilize ownership vouchers and owner certificates to validate and verify signed iPXE scripts. The iPXE scripts may be signed based on an owner certificate, which is then used to verify the iPXE script prior to execution of the iPXE script. The owner certificate may be validated by the ownership voucher.

In particular, an ownership voucher is anchored on a network device through or associated with a unique device identifier and trust anchor certificates, e.g., a secure unique device identifier (SUDI) certificate, which is anchored on the network device as read only, e.g., the certificate cannot be modified. For example, the unique device identifier information is burned onto the network device during manufacture of the network device. An owner certificate for the network device is anchored on the ownership voucher. A manufacturer authorized signing authority (MASA) server stores all unique identifiers for network devices.

During boot up of the network device, right after the UEFI/BIOS stage of the boot up process, in configurations an embedded iPXE script, e.g., a trusted iPXE script, may make a request to a network server, e.g., a iPXE server, for the ownership voucher and owner certificate of the network device. The ownership voucher and owner certificate may then be stored in a trusted platform module (TPM) on the network device.

In configurations, the retrieved owner certificate may be validated by the ownership voucher. The owner certificate may be used to validate and verify iPXE scripts. Once validated and verified, in configurations the iPXE scripts may be executed and the booting process may be continued to the kernel loading step and the application loading step.

In configurations, during a subsequent booting process of the network device, the ownership voucher and owner certificate may be retrieved from the trusted platform module. Prior to executing iPXE scripts during the booting process, the iPXE scripts may be validated and verified by the network device using the owner certificate since the iPXE scripts are signed based on the owner certificate. In configurations, the owner certificate may be validated prior to verification of the iPXE scripts using the ownership voucher.

In configurations, another process may be used to fetch or retrieve the ownership voucher and owner certificate from the iPXE server. For example, secure ZTP (SZTP), command line interface (CLI), etc., may be used.

Since iPXE may be executed when the disk is empty, or because the subsequently image booted image may erase the disk, the ownership voucher and ownership certificate may be stored in the trusted platform module. In configurations, the owner certificate may also be used to help with image validation via signing scripts during the booting process.

Thus, the present disclosure describes techniques and architecture for enabling an iPXE script signature validation and verification arrangement via an ownership voucher and owner certificate framework. In configurations, the techniques may include enhancing the embedded iPXE scripts for fetching the ownership voucher and owner certificate for a network device. The techniques may include using a certificate associated with a unique device identifier certificate or similar certificate of a device based on the ownership voucher and owner certificate workflow.

The presence of the owner certificate in the network device in the pre-boot stage, e.g., between the UEFI/BIOS booting step and the kernel loading step may help with image validation via iPXE.

In configurations, the techniques may include storing the ownership voucher and owner certificate in a trusted platform module (TPM) due to disk wipe scenarios, e.g., iPXE re-imaging, during a booting process.

In configurations, the techniques may also help prevent the network device from running over different networks in a co-located network environment. In particular, the presence of a device specific certificate, i.e., the unique device identifier and trust anchor certificates, the ownership voucher, and the owner certificate, ensures that the network device boots only from its intended service providers and not from other network service providers, or even hacked bootstrap servers, when the network device is deployed in a network with multiple co-located bootstrap servers belonging to different network providers.

As an example, a method may include accessing, at a network device, a preboot eXecution environment (iPXE) script. The iPXE script is signed based on an owner certificate (OC) associated with the network device. The method may also include based at least in part on the OC, validating, the iPXE script. The method may further include executing, by the network device, the iPXE script.

In configurations, accessing the iPXE script may include fetching, from a server using a second iPXE script, an ownership voucher (OV). In such configurations, the method may further include validating, by the network device using the OV, the OC.

In configurations, the method may also include storing the OV and OC in a trusted platform module (TPM).

In configurations, accessing the iPXE script may include fetching, from a trusted platform module (TPM), an ownership voucher (OV). In such configurations, the method may further include verifying, by the network device using the OV, the OC.

In configurations, the method may occur after a unified extensible firmware interface (UEFI)/basic input/output system (BIOS) booting step in a booting process and prior to a kernel loading step in the booting process.

In configurations, the booting process may include booting from an image. In such configurations, the method may further include retrieving the image from a network server.

In configurations, the method may include validating, by the network device using the OC, the image.

In configurations, the method may further include based at least in part on executing the iPXE script, ensuring that the network device boots only from intended service providers in a network comprising multiple bootstrap servers belonging to different service providers.

Thus, the techniques and architecture described herein allow for enabling the signature validation for customer written iPXE scripts, which improves the security posture for network devices. The techniques and architecture described herein also tie the owner certificate and ownership voucher workflow to the iPXE signature validation cause. Furthermore, the techniques and architecture described herein address a threat vector and vulnerability created by unsigned iPXE scripts interface. The techniques and architecture described herein also allow support of device specific handling and creation of iPXE scripts. Additionally, the techniques and architecture described herein help solve the device-specific and co-location aspects in multi-provider deployments. The techniques and architecture described herein also allow stringent security checks to be carried out on scripts that are otherwise outside the purview of iPXE.

The techniques described herein may be performed by a system and/or device having non-transitory computer-readable media storing computer-executable instructions that, when executed by one or more processors, performs the method described above.

EXAMPLE EMBODIMENTS

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
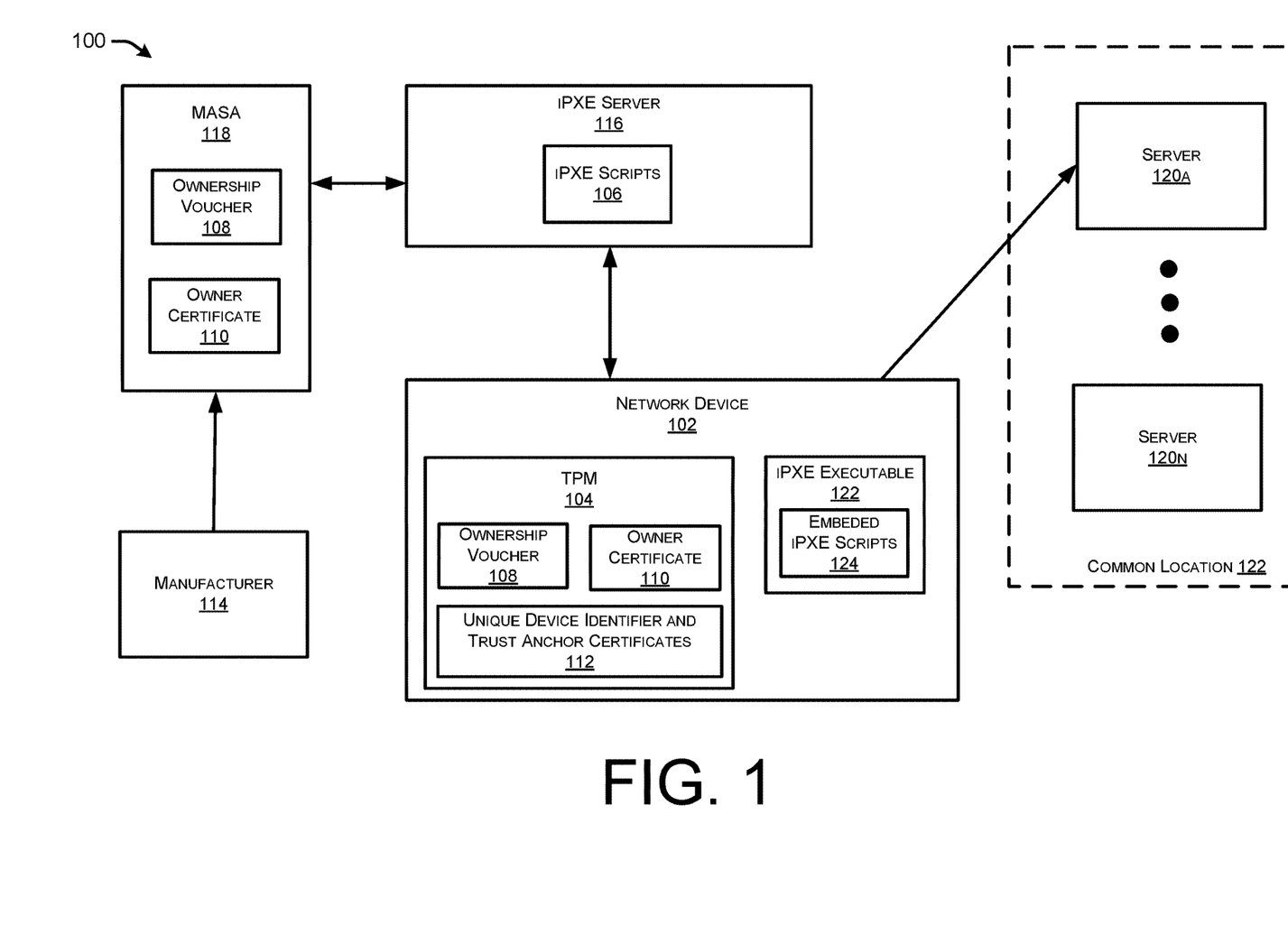
FIG. 1 schematically illustrates an example of a portion of a network where at least some of the network devices in the network utilize signed iPXE scripts during the booting process, where the iPXE scripts are signed based on an owner certificate, in accordance with the techniques and architecture described herein.

FIG. 1 schematically illustrates an example portion of a network 100. The example portion of the network 100 includes a network device 102. Examples of network devices 102 include, but are not limited to, routers, switches, etc. As is known, the network 100 generally includes multiple network devices 102.

The network device 102 may include a trusted platform module (TPM) 104 that may be utilized for storing various data. For example, as will be described further herein, the TPM 104 may store an ownership voucher (OV) 108 and a corresponding owner certificate (OC) 110 for the network device 102. In some configurations, the TPM 104 may store iPXE scripts 106. The network device 102 also includes a unique device identifier and trust anchor certificates 112, e.g., a secure unique device identifier (SUDI) or similar certificate, that is "burned" into the network device 102 during manufacturing of the network device 102 by a manufacturer 114. As is known, the unique device identifier and trust anchor certificates 112 is read-only and thus may not be altered. The network device 102 also includes an iPXE executable 122, which stores embedded iPXE scripts 124, e.g., trusted and/or validated iPXE scripts.

The example portion of the network 100 may also include a iPXE server 116 that provides iPXE scripts 106 and a manufacturer authorized signing authority (MASA) server 118. The example portion of the network 100 may also include multiple servers 120a, . . . , 120n (referred to collectively herein as "servers 120") that are co-located at a common location 122. In configurations, each of the servers 120 may be part of various service providers in the network 100, where the various service providers comprise one or more bootstrap servers belonging to the service providers.

In accordance with configurations, the techniques and architecture provide for verifying and verifying the iPXE scripts 106 prior to execution during a booting process, e.g., a boot up process, a bootstrap process, etc., of the network device 102. The techniques and architecture utilize the ownership voucher 108 and the owner certificate 110 to validate and verify the signed iPXE scripts 106. The iPXE scripts 106 may be signed based on the owner certificate 110, which is then used to verify the iPXE scripts 106 prior to execution of the iPXE scripts 106. In configurations, the owner certificate 110 may be validated by the ownership voucher 108.

In particular, the ownership voucher 108 is anchored on the network device 102 through or associated with the unique device identifier and trust anchor certificates 112, which are anchored on the network device 102 as read only, e.g., the unique device identifier and trust anchor certificates cannot be modified. For example, the unique device identifier and trust anchor certificates are burned onto the network device 102 during manufacture of the network device 102 by the manufacturer 114. The owner certificate 110 for the network device 102 is anchored on the ownership voucher 108. The MASA server 118 may store all unique identifiers for network devices such as network device 102 and may receive the unique identifiers for network devices for the manufacturer 114 (or from another manufacturer or entity).

Thus, the techniques and architecture focus on enabling the per network device 102 (via the unique device identifier and trust anchor certificates) iPXE scripts signature validation via the ownership voucher and owner certificate framework [RFC 8366]. In particular, the techniques and architecture provide for the network device 102 to onboard the following artifacts via iPXE during a booting process of the network device 102:

```
leaf owner-certificate {
type cms;
must ' ../ownership-voucher' {
description
"An ownership voucher must be present whenever an owner
certificate is present.",
}
description
"An Owner Certificate artifact.;
reference;
}
leaf ownership-voucher {
type cms;
must '../owner-certificate' {
description
"An owner certificate must be present whenever an
ownership voucher is present.";
}
description
"An ownership artifact, as described in RFC 8366.";
reference RFC 8366: A Voucher Artifact for Bootstrapping Protocols";
}
```

Accordingly, with the owner certificate 110 that is issued from the MASA server 118 and tailored to a particular user (within, for example, common location 122), signed iPXE scripts 106 may be brought into the network device 102, with the assumption that the signed iPXE scripts 106 will be verified prior to execution (e.g., via imgverify script.ipxe script.ipxe.sig) utilizing the owner certificates 110 brought in via the iPXE ownership voucher 108/owner certificate 110 workflow, similarly to sZTP.

Thus, in configurations, during a booting process of the network device 102, right after the UEFI/BIOS stage of the booting process, one or more iPXE scripts 106 may be accessed by the network device 102. In configurations, an embedded iPXE script 124 (e.g., a trusted iPXE script) may make a request to a network server, e.g., the iPXE server 116, for the ownership voucher 108 and the owner certificate 110 of the network device 102. The iPXE server 116 may then retrieve the ownership voucher 108 and the owner certificate 110 of the network device 102 from the MASA server 118. The ownership voucher 108 and owner certificate 110 may be stored in the TPM 104 on the network device 102. In configurations, an embedded iPXE script 106 may make a request directly to the MASA server 118 for the ownership voucher 108 and the owner certificate 110 of the network device 102.

In configurations, the retrieved owner certificate 110 may be validated by the network device 102 using the ownership voucher 108. The owner certificate 110 may then be used to validate and verify the untrusted iPXE scripts 106 since the iPXE scripts 106 are signed based on the owner certificate 110. Once validated and verified, in configurations the iPXE scripts 106 may be executed and the booting process may be continued to the kernel loading step and the application loading step of the booting process for the network device 102.

In configurations, during a subsequent booting process of the network device 102, the ownership voucher 108 and owner certificate 110 may be retrieved from the TPM 104. Prior to executing iPXE scripts 106 during the booting process, the iPXE scripts 106 may be validated and verified by the network device 102 using the owner certificate 110 since the iPXE scripts 106 are signed based on the owner certificate 110. In configurations, the owner certificate 110 may be verified prior to verification of the iPXE scripts 106 by the network device 102 using the ownership voucher 108.

In configurations, another process may be used to fetch or retrieve the ownership voucher 108 and owner certificate 110 from the iPXE server 116 (or directly from the MASA server 118). For example, secure ZTP (SZTP), command line interface (CLI), etc., may be used to fetch the ownership voucher 108 and owner certificate 110.

During execution of the iPXE scripts 106, one or more of the iPXE scripts 106 may be attempting to onboard the network device 102 with one of the servers 120, e.g., server 120a, where the servers 120 are co-located at the common location 122. By validating and verifying the iPXE scripts 106 prior to execution of the iPXE scripts 106, the network device 102 may be prevented from onboarding with the wrong server 120. As previously noted, co-location deployment of network devices is an example of a use case where device specific and signed iPXE script clarification and validation is extremely important. If the network device 102 is deployed in a network where there are multiple co-located servers 120, for example, co-located servers 120 that belong to different service providers, it is important to make sure that the network device 102 boots from the "intended" service provider network for which it is deployed and not from other co-located service provider servers and/or hacked service provider servers.

Since iPXE may be executed when the disk is empty, or because the subsequently image booted image may erase the disk, the ownership voucher 108 and owner certificate 110 may be stored in the trusted platform module 104. In configurations, the owner certificate 110 may also be used to help with image validation via signing scripts during the booting process.

Figure 2:
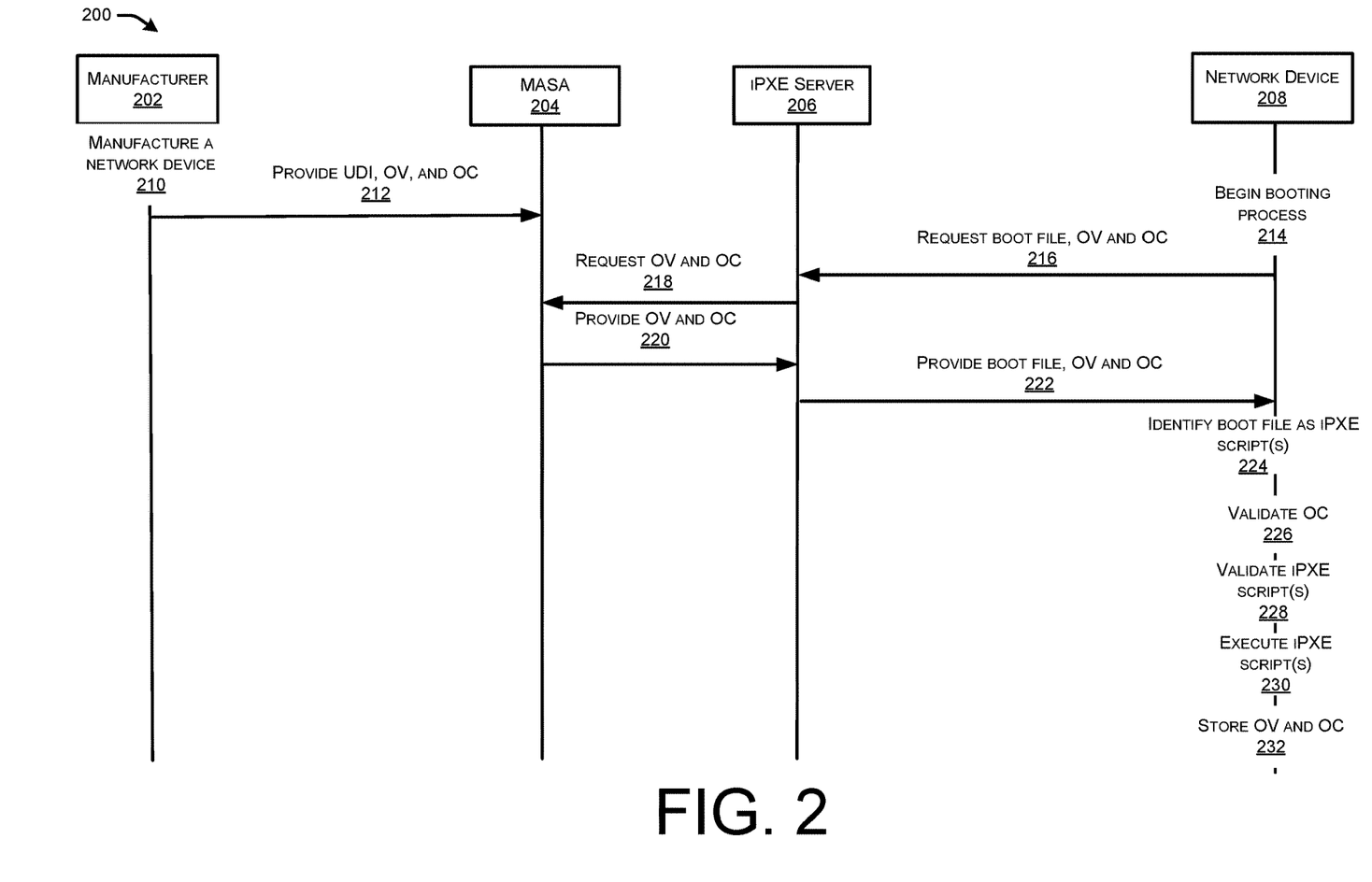
FIG. 2 schematically illustrate example workflow for verifying iPXE scripts during a booting process for a network device after a unified extensible firmware interface (UEFI)/basic input/output system (BIOS) booting step in the booting process and prior to a kernel loading step in the booting process, in accordance with the techniques and architecture described herein.

FIG. 2 schematically illustrates a flow diagram of an example workflow 200 for verifying iPXE scripts, e.g., iPXE scripts 106, during a booting process for a network device, e.g., network device 102, after a unified extensible firmware interface (UEFI)/basic input/output system (BIOS) booting step in the booting process and prior to a kernel loading step in the booting process.

The flow diagram 200 includes a manufacturer, 202, e.g., manufacturer 114, and a manufacturer authorized signing authority (MASA) server 204, e.g., MASA server 118. The flow diagram 200 further includes a iPXE server 206, e.g., iPXE server 116 and a network device 208, e.g., network device 102.

At 210, the manufacturer 202 manufactures the network device 208. During the manufacture of the network device 208, the manufacturer 202 burns in a unique device identifier and trust anchor certificates 112, e.g., a SUDI certificate, or similar certificate for the network device. The unique device identifier and trust anchor certificates cannot be altered, e.g., the unique device identifier and trust anchor certificates are read only.

At 212, the manufacturer 202 may provide the unique device identifier and trust anchor certificates, e.g., unique device identifier and trust anchor certificates 112, along with an ownership voucher, e.g., ownership voucher 108, and an owner certificate, e.g., owner certificate 110, to the MASA server 204. In particular, the ownership voucher is anchored on the network device 208 through or associated with the unique device identifier and trust anchor certificates, which is anchored on the network device 208 as read only, e.g., the certificate cannot be modified. For example, the unique device identifier and trust anchor certificates are burned onto the network device 208 during manufacture of the network device 208 by the manufacturer 202. The owner certificate for the network device 208 is anchored on the ownership voucher. The MASA server 204 stores all unique identifiers for network devices such as network device 208 and may receive the unique identifiers for network devices for the manufacturer 202 (or from another manufacturer or entity).

At 214, the network device 208 may begin a booting process. After the UEFI/BIOS step in the booting process and prior to the kernel loading step in the booting process, the network device 208 may attempt to execute iPXE scripts, e.g., iPXE scripts 106. For example, the iPXE scripts may be configured to cause the network device 208 to onboard with one of the servers 120. In accordance with configurations, prior to executing the iPXE scripts, the network device 208 needs to validate the iPXE scripts. Thus, at 216, the network device 208 may request a boot file (which includes one or more iPXE scripts), an ownership voucher and owner certificate from the iPXE server 206. At 218, the iPXE server 206 may request the ownership voucher and owner certificate from the MASA server 204. Additionally, the iPXE server 206, in configurations, may request the unique device identifier and trust anchor certificates of the network device 208, e.g., the unique device identifier and trust anchor certificates 112 for the network device 208.

At 220, the MASA server 204 may provide the ownership voucher and owner certificate to the iPXE server 206. In configurations, if requested, the MASA server 204 may also provide the unique device identifier and trust anchor certificates 112 to the iPXE server 206.

At 222, the iPXE server 206 may provide a response to the network device 208. The response may include the boot file (which includes one or more iPXE scripts), the ownership voucher and owner certificate. In configurations, if requested, the response may also include the unique device identifier and trust anchor certificates.

In particular, during a booting process of the network device 208, right after the UEFI/BIOS stage of the booting process, an embedded iPXE script 124 may make a request to the iPXE server 206 for the boot file (which includes one or more iPXE scripts), the ownership voucher and the owner certificate of the network device 208. The iPXE server 206 may then retrieve the ownership voucher and the owner certificate of the network device 208 from the MASA server 204. In configurations, an embedded iPXE script 124 may make a request directly to the MASA server 204 for the ownership voucher 108 and the owner certificate (and/or the unique device identifier and trust anchor certificates) of the network device 208.

At 224, the network device 208 may identify the boot file as including one or more iPXE scripts. At 226, the network device 208 may use the ownership voucher to validate the owner certificate. At 228, the network device 208 may use the owner certificate to verify the iPXE scripts that are to be executed by the network device 208. If the iPXE scripts are validated, then at 230, the network device 208 may execute the iPXE scripts. For example, the iPXE scripts may cause the network device 208 to onboard with one of the servers 120.

At 232, in configurations, the network device 208 may store the ownership voucher and owner certificate in a trusted platform module (TPM), e.g., TPM 104. Additionally, the network device 208 may store the unique device identifier and trust anchor certificates 112 in the TPM. The unique device identifier and trust anchor certificates 112 may be utilized by the network device to validate the ownership voucher.

In particular, in configurations, the retrieved owner certificate may be validated by the network device 208 using the ownership voucher. The owner certificate may then be used to validate and verify the iPXE scripts since the iPXE scripts are signed based on the owner certificate. Once validated and verified, in configurations the iPXE scripts may be executed and the booting process may be continued to the kernel loading step and the application loading step of the booting process for the network device 208. The ownership voucher 108 and owner certificate 110 may also be stored in the TPM on the network device 208. In configurations, during a subsequent booting process of the network device 102, the ownership voucher 108 and owner certificate 110 may be retrieved from the TPM 104. Prior to executing iPXE scripts 106 during the booting process, the iPXE scripts 106 may be validated and verified by the network device 102 using the owner certificate 110 since the iPXE scripts 106 are signed based on the owner certificate 110. In configurations, the owner certificate 110 may be validated prior to validation of the iPXE scripts 106 by the network device 102 using the ownership voucher 108.

Figure 3:
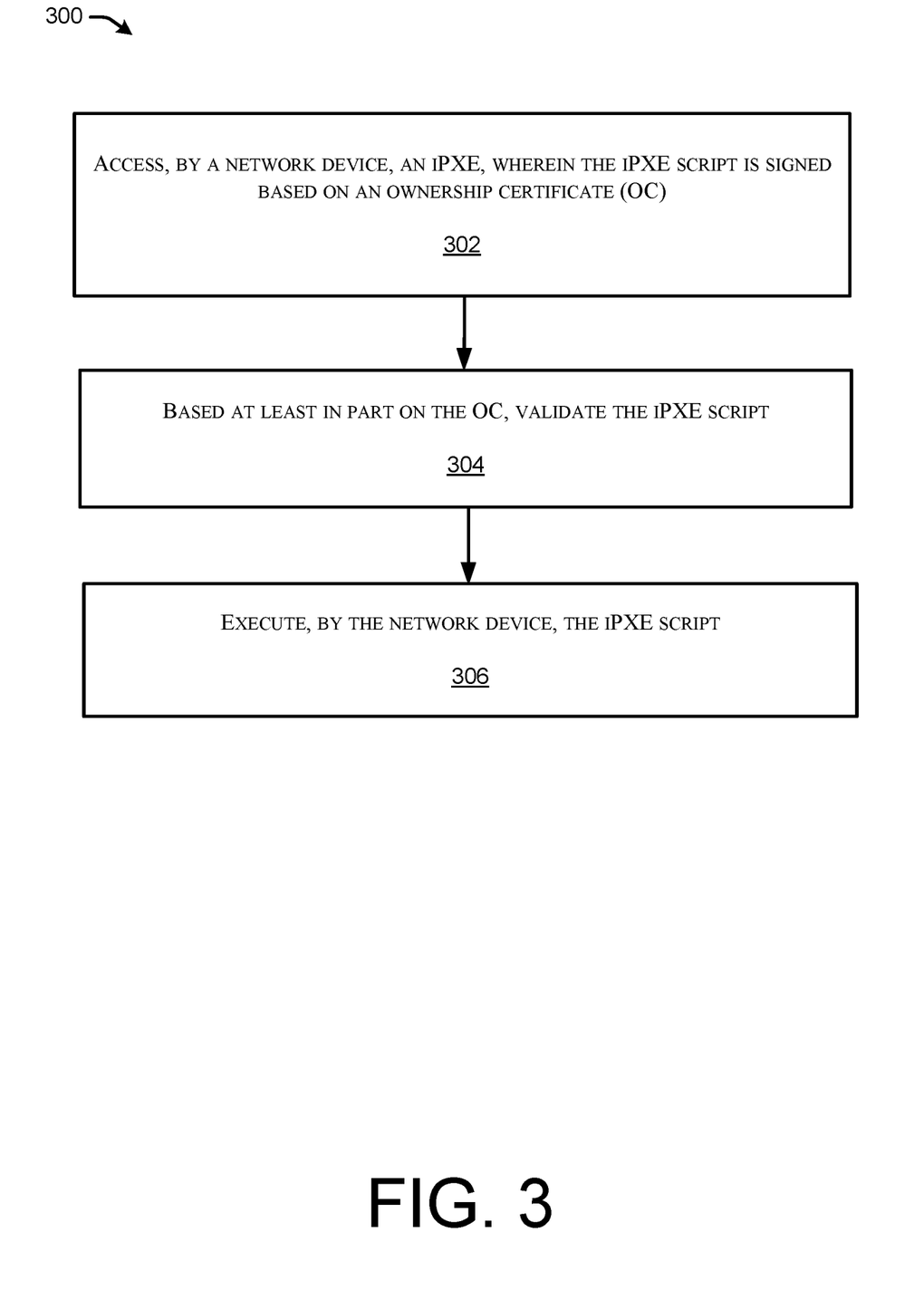
FIG. 3 illustrates a flow diagram of an example method for verifying iPXE scripts, where the iPXE scripts are signed based on an owner certificate, in accordance with the techniques and architecture described herein.

FIG. 3 illustrates a flow diagram of an example method 300 and illustrates aspects of the functions performed at least partly by network devices of a network as described with respect to FIGS. 1 and 2. The logical operations described herein with respect to FIG. 3 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 3 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 3 illustrates a flow diagram of an example method 300 for verifying iPXE scripts, e.g., iPXE scripts 106, where the iPXE scripts are signed based on an owner certificate, e.g., owner certificate 110. In some examples, the method 300 may be performed by a system comprising one or more processors and one or more non-transitory computer-readable media storing computer-executable instructions that, when executed by the one or more processors, cause the one or more processors to perform the method 300.

At 302, a pre-boot eXecution environment (iPXE) script is accessed by a network device, wherein the iPXE script is signed based on an owner certificate (OC). For example, during a booting process of the network device 102, right after the UEFI/BIOS stage of the booting process, one or more iPXE scripts 106 may be accessed by the network device 102. In configurations, an embedded iPXE script 124 may make a request to a network server, e.g., the iPXE server 116, for the ownership voucher 108 and the owner certificate 110 of the network device 102. The iPXE server 116 may then retrieve the ownership voucher 108 and the owner certificate 110 of the network device 102 from the MASA server 118. The ownership voucher 108 and owner certificate 110 may also be stored in the TPM 104 on the network device 102 for subsequent booting processes of the network device 102. In configurations, an embedded iPXE script 124 may make a request directly to the MASA server 118 for the ownership voucher 108 and the owner certificate 110 of the network device 102.

At 304, based at least in part on the OC, the iPXE script is validated. For example, in configurations, the retrieved owner certificate 110 may be validated by the network device 102 using the ownership voucher 108. The owner certificate 110 may then be used to validate and verify the iPXE scripts 106 since the iPXE scripts 106 are signed based on the owner certificate 110.

At 306, the iPXE script is executed by the network device. For example, once validated and verified, in configurations the iPXE scripts 106 may be executed and the booting process may be continued to the kernel loading step and the application loading step of the booting process for the network device 102.

Thus, the present disclosure describes techniques and architecture for enabling an iPXE script signature validation and verification arrangement via an ownership voucher and owner certificate framework. In configurations, the techniques may include enhancing the iPXE scripts for fetching the ownership voucher and owner certificate for a network device. The techniques may include using a unique device identifier and trust anchor certificates or similar certificate(s) of a device based on the ownership voucher and owner certificate workflow. The techniques may also include using a personalized certificate, based on unique device identifier and trust anchor certificates by the iPXE if the ownership voucher and owner certificate are already onboarded, e.g., from a previous booting process via iPXE, secure zero touch provisioning (SZTP), CLI, etc.

In configurations, the techniques may also allow for network administrators to use the owner certificate to sign embedded iPXE scripts so that the resulting signed iPXE scripts may be validated and verified using the owner certificate in the network device, via a command line or via initial RAM disc at the time of deployment. This may be based on the onboarded ownership voucher and the owner certificate in the iPXE stage. The presence of the owner certificate in the network device in the pre-boot stage, e.g., between the UEFI/BIOS booting step and the kernel loading step may help with image validation via the signed iPXE scripts.

In configurations, the techniques may include storing the owner certificate in a trusted platform module (TPM) due to disk wipe scenarios, e.g., iPXE re-imaging, during a booting process. Additionally, the ownership voucher and owner certificate-based approach in the iPXE stage may be used by network administrators for image validation and code signing, i.e., stringent checks before running embedded signed iPXE scripts.

In configurations, the techniques may also help prevent the network device from running over different networks in a co-located network environment. In particular, the presence of a device specific certificate, i.e., the unique device identifier and trust anchor certificates, the ownership voucher, and the owner certificate, ensures that the network device boots only from its intended service providers and not from other network service providers, or even hacked bootstrap servers, when the network device is deployed in a network with multiple co-located bootstrap servers belonging to different network providers.

The techniques and architecture of verifying pre-boot environment/iPXE scripts helps harden the security by adding an additional layer of validation. For example, if there is a known issue/vulnerability with the iPXE environment, by using this additional validation based on an OC, a malicious actor may be prevented from easily exploiting a known vulnerability. Using the techniques and architecture described herein via the ownership voucher and owner certificate framework [RFC 8366], the techniques and architecture leverage existing protocols/methodologies to enhance the security during a pre-boot environment.

Figure 4:
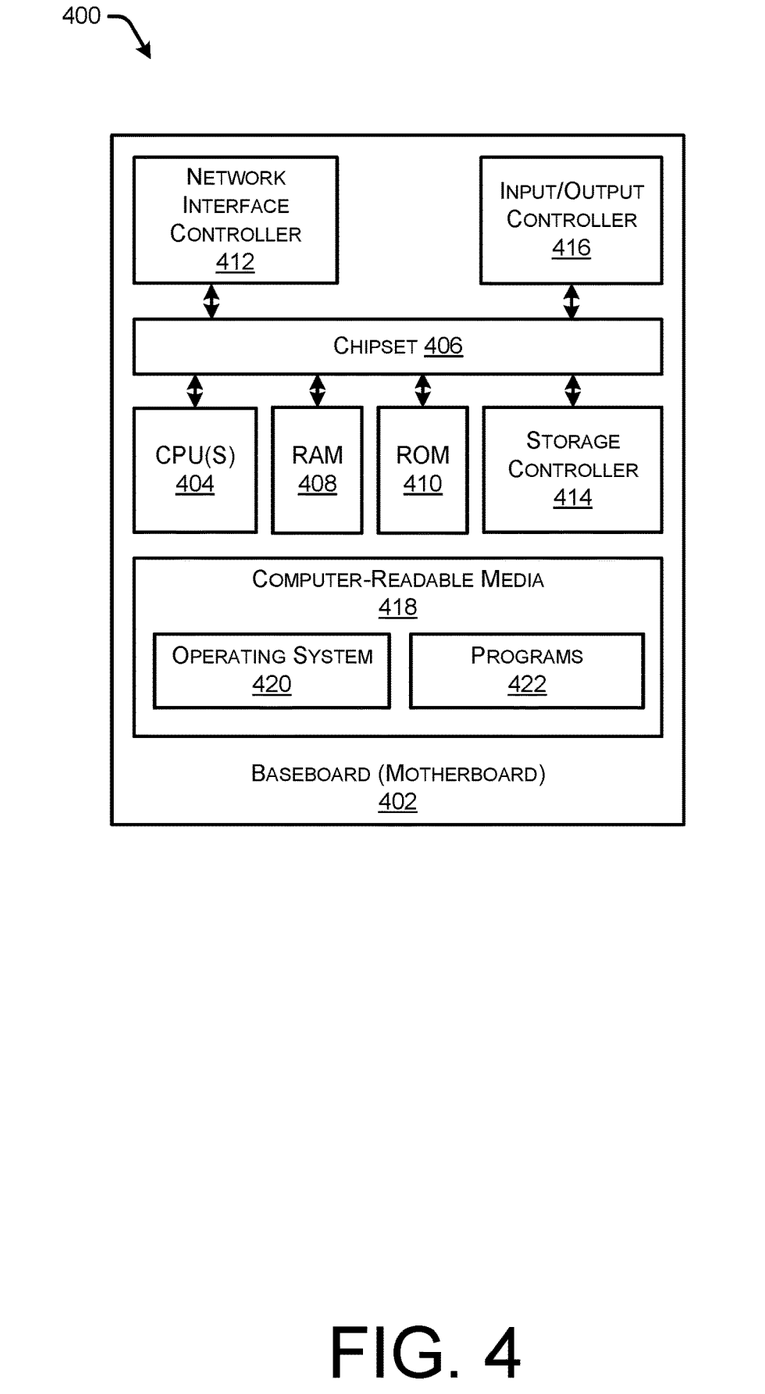
FIG. 4 is a computer architecture diagram showing an example computer hardware architecture for implementing a device that can be utilized to implement aspects of the various technologies presented herein.

FIG. 4 shows an example computer architecture for a computing device 400 capable of executing program components for implementing the functionality described above. In configurations, one or more of the computing devices 400 may be used to implement one or more of the components of FIGS. 1 and 2. The computer architecture shown in FIG. 4 illustrates a conventional server computer, router, switch, workstation, desktop computer, laptop, tablet, network appliance, e-reader, smartphone, or other computing device, and can be utilized to execute any of the software components presented herein. The computing device 400 may, in some examples, correspond to a physical device or resources described herein.

The computing device 400 includes a baseboard 402, or "motherboard," which is a printed circuit board to which a multitude of components or devices can be connected by way of a system bus or other electrical communication paths. In one illustrative configuration, one or more central processing units ("CPUs") 404 operate in conjunction with a chipset 406. The CPUs 404 can be standard programmable processors that perform arithmetic and logical operations necessary for the operation of the computing device 400.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 can provide an interface to a RAM 408, used as the main memory in the computing device 400. The chipset 406 can further provide an interface to a computer-readable storage medium such as a read-only memory ("ROM") 410 or non-volatile RAM ("NVRAM") for storing basic routines that help to startup the computing device 400 and to transfer information between the various components and devices. The ROM 410 or NVRAM can also store other software components necessary for the operation of the computing device 400 in accordance with the configurations described herein.

The computing device 400 can operate in a networked environment using logical connections to remote computing devices and computer systems through a network, such as the arrangement 100. The chipset 406 can include functionality for providing network connectivity through a NIC 412, such as a gigabit Ethernet adapter. In configurations, the NIC 412 a smart NIC (based on data processing units (DPUs)) that can be plugged into data center servers to provide networking capability. The NIC 412 is capable of connecting the computing device 400 to other computing devices over networks. It should be appreciated that multiple NICs 412 can be present in the computing device 400, connecting the computer to other types of networks and remote computer systems.

The computing device 400 can include a storage device 418 that provides non-volatile storage for the computer. The storage device 418 can store an operating system 420, programs 422, and data, which have been described in greater detail herein. The storage device 418 can be connected to the computing device 400 through a storage controller 414 connected to the chipset 406. The storage device 418 can consist of one or more physical storage units. The storage controller 414 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 400 can store data on the storage device 418 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 418 is characterized as primary or secondary storage, and the like.

For example, the computing device 400 can store information to the storage device 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 400 can further read information from the storage device 418 by detecting the physical states or characteristics of one or more particular locations within the physical storage units.

In addition to the mass storage device 418 described above, the computing device 400 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 400. In some examples, the operations performed by the cloud network, and or any components included therein, may be supported by one or more devices similar to computing device 400. Stated otherwise, some or all of the operations described herein may be performed by one or more computing devices 400 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 418 can store an operating system 420 utilized to control the operation of the computing device 400. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 418 can store other system or application programs and data utilized by the computing device 400.

In one embodiment, the storage device 418 or other computer-readable storage media is encoded with computer-executable instructions which, when loaded into the computing device 400, transform the computer from a general-purpose computing system into a special-purpose computer capable of implementing the embodiments described herein. These computer-executable instructions transform the computing device 400 by specifying how the CPUs 404 transition between states, as described above. According to one embodiment, the computing device 400 has access to computer-readable storage media storing computer-executable instructions which, when executed by the computing device 400, perform the various processes described above with regard to FIGS. 1 and 2. The computing device 400 can also include computer-readable storage media having instructions stored thereupon for performing any of the other computer-implemented operations described herein.

The computing device 400 can also include one or more input/output controllers 416 for receiving and processing input from a number of input devices, such as a keyboard, a mouse, a touchpad, a touch screen, an electronic stylus, or other type of input device. Similarly, an input/output controller 416 can provide output to a display, such as a computer monitor, a flat-panel display, a digital projector, a printer, or other type of output device. It will be appreciated that the computing device 400 might not include all of the components shown in FIG. 4, can include other components that are not explicitly shown in FIG. 4, or might utilize an architecture completely different than that shown in FIG. 4.

The computing device 400 may support a virtualization layer, such as one or more virtual resources executing on the computing device 400. In some examples, the virtualization layer may be supported by a hypervisor that provides one or more virtual machines running on the computing device 400 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   accessing, at a network device, a pre-boot execution environment (iPXE) script, wherein the iPXE script is signed based on an owner certificate (OC) associated with the network device;
   fetching, from a server using a trusted iPXE script, an ownership voucher (OV), wherein the OC is anchored on the ownership voucher, wherein the OV is anchored on the network device through a unique device identifier and trust anchor certificates that are anchored on the network device as read only, and wherein the unique device identifier and trust anchor certificates are burned onto the network device during manufacture of the network device by a manufacturer;
   validating, by the network device using the OV, the OC;
   based at least in part on the OC, validating, the iPXE script; and
   executing, by the network device, the iPXE script.

2. The method of claim 1, further comprising:
   storing the OV and OC in a trusted platform module (TPM).

3. The method of claim 1, wherein:
   accessing the iPXE script comprises, fetching, from a trusted platform module (TPM), an ownership voucher (OV); and
   the method further comprises validating, by the network device using the OV, the OC.

4. The method of claim 1, wherein the method occurs after a unified extensible firmware interface (UEFI)/basic input/output system (BIOS) booting step in a booting process and prior to a kernel loading step in the booting process.

5. The method of claim 4, wherein:
   the booting process comprises booting from an image; and
   the method further comprises retrieving the image from a network server.

6. The method of claim 5, further comprising:
   validating, by the network device using the OC, the image.

7. The method of claim 1, further comprising:
   based at least in part on executing the iPXE script, ensuring that the network device boots only from intended service providers in a network comprising multiple bootstrap servers belonging to different service providers.

8. A system comprising:
   one or more processors; and
   one or more non-transitory computer-readable media storing computer-executable instructions that, when executed by the one or more processors, cause the one or more processors to perform actions comprising:
      accessing, at a network device, a pre-boot execution environment (iPXE) script, wherein the iPXE script is signed based on an owner certificate (OC) associated with the network device;
      fetching, from a server using a trusted iPXE script, an ownership voucher (OV), wherein the OC is anchored on the ownership voucher, wherein the OV is anchored on the network device through a unique device identifier and trust anchor certificates that are anchored on the network device as read only, and wherein the unique device identifier and trust anchor certificates are burned onto the network device during manufacture of the network device by a manufacturer;
      validating, by the network device using the OV, the OC;
      based at least in part on the OC, validating, the iPXE script; and
      executing, by the network device, the iPXE script.

9. The system of claim 8, further comprising:
   storing the OV and OC in a trusted platform module (TPM).

10. The system of claim 8, wherein:
    accessing the iPXE script comprises, fetching, from a trusted platform module (TPM), an ownership voucher (OV); and
    the actions further comprises validating, by the network device using the OV, the OC.

11. The system of claim 8, wherein the actions occur after a unified extensible firmware interface (UEFI)/basic input/output system (BIOS) booting step in a booting process and prior to a kernel loading step in the booting process.

12. The system of claim 11, wherein:
    the booting process comprises booting from an image; and
    the actions further comprises retrieving the image from a network server.

13. The system of claim 12, further comprising:
    validating, by the network device using the OC, the image.

14. The system of claim 8, further comprising:
based at least in part on executing the iPXE script, ensuring that the network device boots only from intended service providers in a network comprising multiple bootstrap servers belonging to different service providers.

15. One or more non-transitory computer-readable media storing computer-executable instructions that, when executed by one or more processors, cause the one or more processors to perform actions comprising:
accessing, at a network device, a pre-boot execution environment (iPXE) script, wherein the iPXE script is signed based on an owner certificate (OC) associated with the network device;
fetching, from a server using a trusted iPXE script, an ownership voucher (OV), wherein the OC is anchored on the ownership voucher, wherein the OV is anchored on the network device through a unique device identifier and trust anchor certificates that are anchored on the network device as read only, and wherein the unique device identifier and trust anchor certificates are burned onto the network device during manufacture of the network device by a manufacturer;
validating, by the network device using the OV, the OC;
based at least in part on the OC, validating, the iPXE script; and
executing, by the network device, the iPXE script.

16. The one or more non-transitory computer-readable media of claim 15, wherein the actions further comprise:
storing the OV and OC in a trusted platform module (TPM).

17. The one or more non-transitory computer-readable media of claim 15, wherein:
accessing the iPXE script comprises, fetching, from a trusted platform module (TPM), an ownership voucher (OV); and
the actions further comprise validating, by the network device using the OV, the OC.

* * * * *